United States Patent
Fisher

(10) Patent No.: US 10,936,477 B2
(45) Date of Patent: Mar. 2, 2021

(54) END-TO-END USER INTERFACE COMPONENT TESTING

(71) Applicant: salesforce.com, inc., San Francisco, CA (US)

(72) Inventor: Hui S. Fisher, Bellevue, WA (US)

(73) Assignee: salesforce.com, inc., San Francisco, CA (US)

(*) Notice: Subject to any disclaimer, the term of this patent is extended or adjusted under 35 U.S.C. 154(b) by 21 days.

(21) Appl. No.: 15/885,240

(22) Filed: Jan. 31, 2018

(65) Prior Publication Data
US 2019/0235998 A1 Aug. 1, 2019

(51) Int. Cl.
*G06F 11/36* (2006.01)
*G06F 16/958* (2019.01)
*G06F 16/955* (2019.01)

(52) U.S. Cl.
CPC ........ *G06F 11/3688* (2013.01); *G06F 16/958* (2019.01); *G06F 16/9566* (2019.01)

(58) Field of Classification Search
CPC . G06F 8/38; G06F 3/0482; G06F 8/34; G06F 11/3668; G06F 3/04847; G06F 11/2294; G06F 17/30887; G06F 17/5009; G06F 3/011; G06F 11/3684; G06F 11/3664; G06F 11/368; G06F 11/3688; G06F 16/958; G06F 16/9566
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |

(Continued)

OTHER PUBLICATIONS

Giuseppe Antonio Di Lucca et al.; Testing Web Applications; IEEE; pp. 310-319; retrieved on Oct. 20, 2020 (Year: 2002).*

(Continued)

*Primary Examiner* — S. Sough
*Assistant Examiner* — Cuong V Luu
(74) *Attorney, Agent, or Firm* — Weaver Austin Villeneuve & Sampson LLP

(57) ABSTRACT

Systems, apparatus, methods and computer program products for end-to-end user interface component testing in a database system. More particularly, a test script is executed, where the test script is configured to simulate user interactions with one or more user interface components of a web application. The test script is configured to load a user interface component using a network address, request a manipulation of the user interface component, and obtain in response to requesting the manipulation of the user interface component, information describing a state of the user interface component following the manipulation of the user interface component.

20 Claims, 8 Drawing Sheets

(56) References Cited

U.S. PATENT DOCUMENTS

| | | |
|---|---|---|
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,572,505 B2 * | 10/2013 | Lee .................. G06F 17/30861 715/769 |
| 8,646,103 B2 | 2/2014 | Jakobson et al. |
| 9,720,811 B2 * | 8/2017 | Frýe et al. .......... G06F 11/3612 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |

(56) References Cited

U.S. PATENT DOCUMENTS

| | | | |
|---|---|---|---|
| 2004/0268312 A1* | 12/2004 | Abe | G06F 11/3604 717/124 |
| 2005/0050555 A1 | 3/2005 | Exley et al. | |
| 2005/0091098 A1 | 4/2005 | Brodersen et al. | |
| 2008/0249972 A1 | 10/2008 | Dillon | |
| 2009/0063415 A1 | 3/2009 | Chatfield et al. | |
| 2009/0100342 A1 | 4/2009 | Jakobson | |
| 2009/0177744 A1 | 7/2009 | Marlow et al. | |
| 2011/0218958 A1 | 9/2011 | Warshaysky et al. | |
| 2011/0247051 A1 | 10/2011 | Bulumulla et al. | |
| 2012/0042218 A1 | 2/2012 | Cinarkaya et al. | |
| 2012/0198351 A1* | 8/2012 | Lee | G06F 17/30861 715/744 |
| 2012/0233137 A1 | 9/2012 | Jakobson et al. | |
| 2012/0290407 A1 | 11/2012 | Hubbard et al. | |
| 2013/0086560 A1* | 4/2013 | Shen | G06F 11/3688 717/131 |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya et al. | |
| 2014/0359537 A1 | 12/2014 | Jakobson et al. | |
| 2015/0006289 A1 | 1/2015 | Jakobson et al. | |
| 2015/0007050 A1 | 1/2015 | Jakobson et al. | |
| 2015/0095162 A1 | 4/2015 | Jakobson et al. | |
| 2015/0142596 A1 | 5/2015 | Jakobson et al. | |
| 2015/0172563 A1 | 6/2015 | Jakobson et al. | |
| 2016/0212073 A1* | 7/2016 | Kulkarni | H04L 51/04 |
| 2017/0004064 A1* | 1/2017 | Rufai | G06F 11/3612 |
| 2018/0137035 A1* | 5/2018 | Magre | G06F 11/3692 |

OTHER PUBLICATIONS

William G.J. Halfond et al.; Precise Interface Identification to Improve Testing and Analysis of Web Applications; ACM; pp. 285-295; retrieved on Oct. 20, 2020 (Year: 2009).*

"Google Plus Users", Google+Ripples, Oct. 31, 2011 [retrieved on Feb. 21, 2012 from Internet at http://www.googleplusers.com/google-ripples.html], 3 pages.

* cited by examiner

FIGURE 4

END-TO-END USER INTERFACE COMPONENT TESTING

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to end-to-end user interface component testing in a database system. More specifically, this patent document discloses techniques for efficient automation of end-to-end user interface component testing.

BACKGROUND

"Cloud computing" services provide shared resources, applications, and information to computers and other devices upon request. In cloud computing environments, services can be provided by one or more servers accessible over the Internet rather than installing software locally on in-house computer systems. As such, users can interact with cloud computing services to undertake a wide range of tasks.

BRIEF DESCRIPTION OF THE DRAWINGS

The included drawings are for illustrative purposes and serve only to provide examples of possible structures and operations for the disclosed inventive systems, apparatus, methods and computer program products for efficient automation of end-to-end user interface component testing. These drawings in no way limit any changes in form and detail that may be made by one skilled in the art without departing from the spirit and scope of the disclosed implementations.

FIG. 4 shows an example of a presentation displayed in the form of a graphical user interface (GUI) for some implementations of automated end-to-end testing of user interface components.

DETAILED DESCRIPTION

Figure 1:
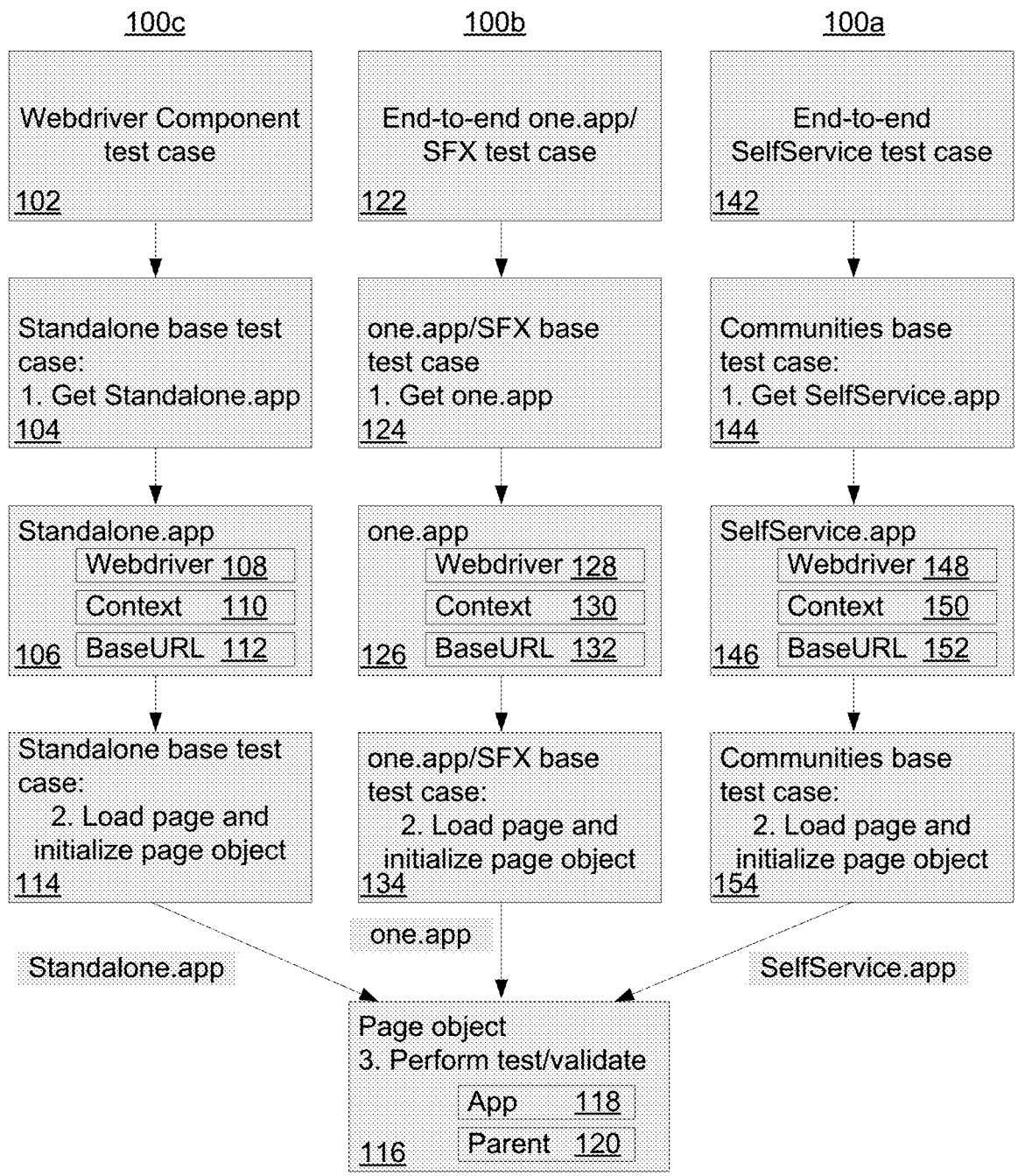
FIG. 1 shows flowcharts of examples of computer-implemented methods 100a, 100b and 100c for some implementations of automated end-to-end testing of user interface components.

Examples of systems, apparatus, methods and computer-readable storage media according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations of the disclosed systems, apparatus, methods and computer program products are configured for end-to-end testing of a UI platform. One non-limiting example of such a user interface (UI) platform is the Chatter platform, provided by salesforce.com, inc. As discussed herein, a cloud computing service such as Chatter is used in different salesforce.com, inc. applications, such as Lightning, Communities, etc., and also outside of salesforce.com applications. Each corresponds to a different container for Chatter.

Some automated testing for an end-to-end customer scenario that models usage of Chatter involves loading the container and validating numerous conditions, such as the successful loading of a webpage. Some of the conditions specifying validation are associated with the container (e.g., operations of user authentication), but are not directly associated with a Chatter UI component that is the focus of testing. In other words, conditions directly associated with the Chatter UI component being tested form only a portion of the "long chain" of conditions in an end-to-end test. Some of the disclosed techniques can ameliorate issues caused by end-to-end testing methodologies that rely on validating all the conditions forming the "long chain."

Certain conditions, while not directly associated with the Chatter UI component being tested, can correspond to dependencies that the Chatter component may exhibit with respect to the container that the Chatter component is running within. For example, a Chatter component may have a navigational dependency, such as a sequence of navigation operations (e.g., login, click on Chatter tab, then click on Admin options, then click on text entry box, etc.) to be performed by a web browser automation interface, such as Selenium WebDriver, to reach the Chatter component in the particular container. Each may involve validation during automated testing, but does not specifically relate to testing functionality of the Chatter component itself. Automated testing throughput can be improved by reducing dependencies between the Chatter component subject to testing and the particular container. In one implementation, rather than access the Chatter component to test by navigating from a landing page in the Lightning application, the test method can load a standalone application and load a Uniform Resource Locator (URL) containing the Chatter component to test. The automated testing process, beyond this particular example, is discussed in further detail below.

FIG. 1 shows flowcharts of examples of computer-implemented methods 100a, 100b and 100c for some implementations of automated end-to-end testing of user interface components. FIG. 1 is described with reference to FIGS. 2-5. FIGS. 2-5 show examples of flowcharts and presentations displayed in the form of graphical user interfaces (GUIs) for automated end-to-end testing of UI components in accordance with some implementations. While methods 100a-c may be described herein as executing on a server, one having skill in the art would appreciate that the disclosed techniques can be practiced using a variety of other computing devices, including computing devices using a distributed architecture.

At 142 of FIG. 1, an end-to-end test script can be initiated for a particular component in a particular application, such as the depicted selfservice.app, which corresponds to the Communities container.

At 144 of FIG. 1, the selfservice.app file, and in some implementations, related resources, can be downloaded to a server executing the test script.

At 146, various parameters related to the testing methodology can be initialized. By way of illustration, WebDriver 148 can be instantiated to provide an interface for programmatically controlling a particular web browser for simulating user behavior.

As another example, context 150 can be derived from the selfservice.app container. In certain implementations, context 150 corresponds to the properties of, for example, a page object representing the landing page for selfservice.app. Non-limiting examples of properties include a form factor (e.g., tablet, phone, desktop), screen orientation (e.g., landscape, portrait), screen size (e.g., 960×640, 1280×1024), framework mode (e.g., salesforce Aura), application mode (e.g., Lightning desktop, Lightning community, Salesforce1 mobile, Salesforce1 community), browser user agent, browser information (e.g., browser type), accessibility settings (e.g., enabled or disabled), swizzling settings (e.g., enabled or disabled), timeout values, network ID, and so forth.

As a further example, BaseURL 152 can be initialized. In various implementations, BaseURL corresponds to a base server URL for the server hosting cloud services for self-service.app. For example, BaseURL can correspond to org62.my.force.com/sserv. In some implementations, the network ID as described above for context 150 can be used for URL generation. For example, each salesforce.com, inc.-hosted network may have its own unique "force.com" base URL. In certain implementations, when the network ID field is null, an application server URL, such as org62.my.force.com/sserv/selfservice.app can be used as the base URL. It should be appreciated that in various implementations, there may be a need to reset the application server URL when the network ID is changed.

In some implementations, at 146, base level tests can be performed to validate various conditions associated with initial use of the selfservice.app. As non-limiting examples, authentication/sign-on processes can be validated.

At 154, using WebDriver 148, page object context 150, and BaseURL 152, test method 100a can programmatically control the web browser to navigate to a page in the selfservice.app application with the component that is the focus of the test. In certain implementations, the page with the component to test is modeled with a target page object that is initialized in 154. The target page object provides, in an example implementation using Java, public methods that can be used to interact with the component to test. For example, a public method for adding a comment to a feed can be provided by the target page object.

In 116, the test script uses the target page object initialized in 154 to perform a test on a component. For example, a comment can be added to a feed. In various implementations, the functionality of the component to test can have dependencies on resources provided by the application 118, which in the case of test method 100a, corresponds to selfservice.app. By way of illustration, selfservice.app may have a particular layout for navigation in the application, such as a horizontal group of tabs. To reach a text input field for a UI component for posting a new comment, there is a corresponding navigational dependency, such as a sequence of logging in, clicking on a "feed" tab in a particular position, and then clicking on the text entry box that is in a particular position. Each operation in the navigational sequence may be specific to selfservice.app. For example, the one.app container corresponding to test method 100b may, for illustrative purposes, use a vertical navigation menu rather than a horizontal group of tabs, and reaching the text entry box may specify clicking on both an "All feeds" menu option and then a "My feeds" sub-menu option. Each of these navigational dependencies specify validation (e.g., check page loaded properly, etc.), though the navigation operations themselves do not relate to the actual functionality of posting a new comment.

Other forms of dependencies, such as a network address, webpage element identifier, locator, event handler, or user interface input, may also be specific to the container application, such as selfservice.app for test method 100a. By way of illustration, selfservice.app may be an event driven framework that supports hierarchical components. For example, the functionality of the component to test can have dependencies on parent component 120, which can correspond to components that encapsulate the component being tested. In other words, the component being tested can be a hierarchical subcomponent, such as, for example, a text input field, and parent component 120, continuing the example, can be a post publisher for a group feed that includes the text input field. Parent component 120 may implement event handlers that respond to interface events related to the component being tested. By way of illustration, parent component 120 may handle the event of a user interaction (e.g., mouse click) on the "Share" icon associated with a text input field, which is necessary to process the addition of a comment to a feed.

At 116, the test result can be validated. By way of illustration, the target page object can be invoked to count the number of feed comments after test method 100a has called the public method to create a new comment. If the count value has not been incremented, test method 100*a* can detect a validation issue. The results of the test, corresponding to interaction with the component being tested, can be returned by test method 100*a* for further processing, such as terminating a test suite if component validation is indicated as failing.

It should be appreciated that the above description regarding test method 100*a* similarly applies to test method 100*b* of FIG. 1.

For example, at 122 of FIG. 1, an end-to-end test script can be initiated for a particular component in the depicted one.app, which corresponds to the Salesforce1/Lightning container.

At 124 of FIG. 1, the one.app file can be downloaded to a server executing the test script.

At 126, various parameters related to the testing methodology can be initialized. It should be further appreciated that the particular values for WebDriver 128, context 130, and BaseURL 132 in test method 100*b* will differ from their counterparts in test method 100*a*. For example, BaseURL 132 can correspond to org62.lightning.force.com/one/instead.

At 134, using WebDriver 128, page object context 130, and BaseURL 132, test method 100*b* can programmatically control the web browser to navigate to a page in the one.app application with the component that is the focus of the test.

It should be noted that despite the different containers, selfservice.app in test method 100*a*, and one.app in test method 100*b*, respectively, each test method for each container leads to returning the same target page object that is used to interact with the component to test in 116. In other words, the component to test, such as a Chatter UI component for posting a comment to a group feed, can be provided to a user through different containers (i.e., selfservice.app, one.app, etc.). It should also be noted that a particular component may have different dependencies with respect to the container being used. Thus, despite testing the same UI component, the end-to-end implementation of test method 100*a* and test method 100*b*, each of which can correspond to a customer use scenario for the same UI component, will differ.

In other words, the scenario based automated testing of UI components, such as a Chatter UI component, is affected by the characteristics of the container, which results in complexity and dependencies on the WebDriver page objects, both before and after the Chatter UI is invoked. The dependencies are specified for the end-to-end customer scenario test to pass. The complexity and dependencies make test development expensive, and can produce large numbers of test failures that make debugging burdensome.

Some of the disclosed techniques can ameliorate issues associated with UI component end-to-end testing methodologies that involve numerous dependencies on a container. By way of illustration, in certain implementations, scenario based automated testing of a UI component can occur outside of containers such as selfservice.app or one.app, and instead occurs in a standalone application (standalone container). The standalone application can eliminate the dependencies the Chatter UI component may have on a particular container, and allows automated testing to focus exclusively on the Chatter UI component functionality, which cuts down development cost.

In some implementations, the standalone application can utilize the WebDriver page objects and salesforce Aura framework, and provide a layer between the Aura JavaScript tests and WebDriver integration tests. This allows testing of a UI component outside of the original application container, which may be beneficial when the test specifications exceed what the Aura JavaScript test framework provides. For example, a test may correspond to mocking complex test data types from the back-end, which is beyond the Aura framework's test capability, but can be easily done via Java testing utilities. As another example, a test may specify user interactions that cannot be simulated via the Aura test framework.

A UI component, or component, as referred to herein corresponds to a portion of a user interface. As a nonlimiting example, in certain implementations, a UI component can be a modular and potentially reusable section of a UI of an application. Thus, a UI component, or component, may not necessarily correspond to a unit, which as referred to herein corresponds to a minimum or other small-scale testable part of an application. As nonlimiting examples, a unit may be a function, procedure, a class or a complex algorithm. It should be appreciated that by using, for example, the WebDriver automation platform, the presently disclosed testing techniques for user interface components can simulate user interactions, and can thus be characterized as end-to-end testing. It should be further appreciated that such end-to-end testing of user interface components is in contrast to unit testing by, for example, JavaScript technology such as Jasmine, xUnit, etc., which do not mimic end user interaction.

Non-limiting examples of implementations of efficient automated end-to-end testing techniques for user interface components are described as follows.

Returning to FIG. 1, at 102 of FIG. 1, a test method 100*c* corresponding to a test script can be initiated for a particular component in the depicted standalone.app.

At 104 of FIG. 1, the standalone.app file can be downloaded to a server executing the test script. In some implementations, the standalone application is configured to receive a customized context. By way of illustration, the standalone application can include a method that receives a customized URL, or network address/ID, corresponding to the page or portion of the page having the component providing, for example, a particular user interface feature to test.

At 106, various parameters related to the testing methodology can be initialized. Similar to test methods 100*a-b*, WebDriver 108 can be instantiated for controlling a web browser. In certain implementations, context 110 corresponds to properties of page objects. In some but not all implementations, operation of the WebDriver results in particular property values for the context. In particular implementations, for the standalone application, the context that may have resulted from WebDriver commands for WebDriver 108 can be overwritten with a customized context 110. By overwriting using a customized context in standalone.app, obtaining the context no longer relies on operation of the application container originally intended to be used for presenting a particular component to a user (e.g., one.app or selfservice.app). In various implementations, the customized context for standalone.app can be replicated from a context derived from WebDriver operation in a different application container, such as one.app or selfservice.app.

By way of illustration, the overwritten context can set BaseURL 112, which may have corresponded to an application container such as one.app or selfservice.app, with a BaseURL corresponding to the standalone application.

At 114, using WebDriver 108, context 110, and BaseURL 112, test method 100*a* can programmatically control the web browser to load to a page in the standalone.app application with the UI component that is the focus of the test, such as the UI component for adding a new comment to a feed. In certain implementations, BaseURL 112 can be further supplemented with a UI component parameter URL string such that the combined URL corresponds to the UI component to test, such as a post publisher for authoring comments. By way of illustration, the page to load as derived from BaseURL 112, such as, for example, the combined URL, may be different than the first page, such as, for example, a landing page that is provided in containers such as one.app or selfservice.app. Continuing the example, in one.app or selfservice.app, the first page may be a login page specifying authentication before any Chatter UI components can be invoked in a later page. Therefore, in the standalone.app, as a nonlimiting example, navigation through the landing page is not necessary to reach the UI component that is the focus of the test. This minimizes the occurrence of "flappers," or unreliable test results that are associated with low confidence due to potential dependencies on the container.

Figure 4:
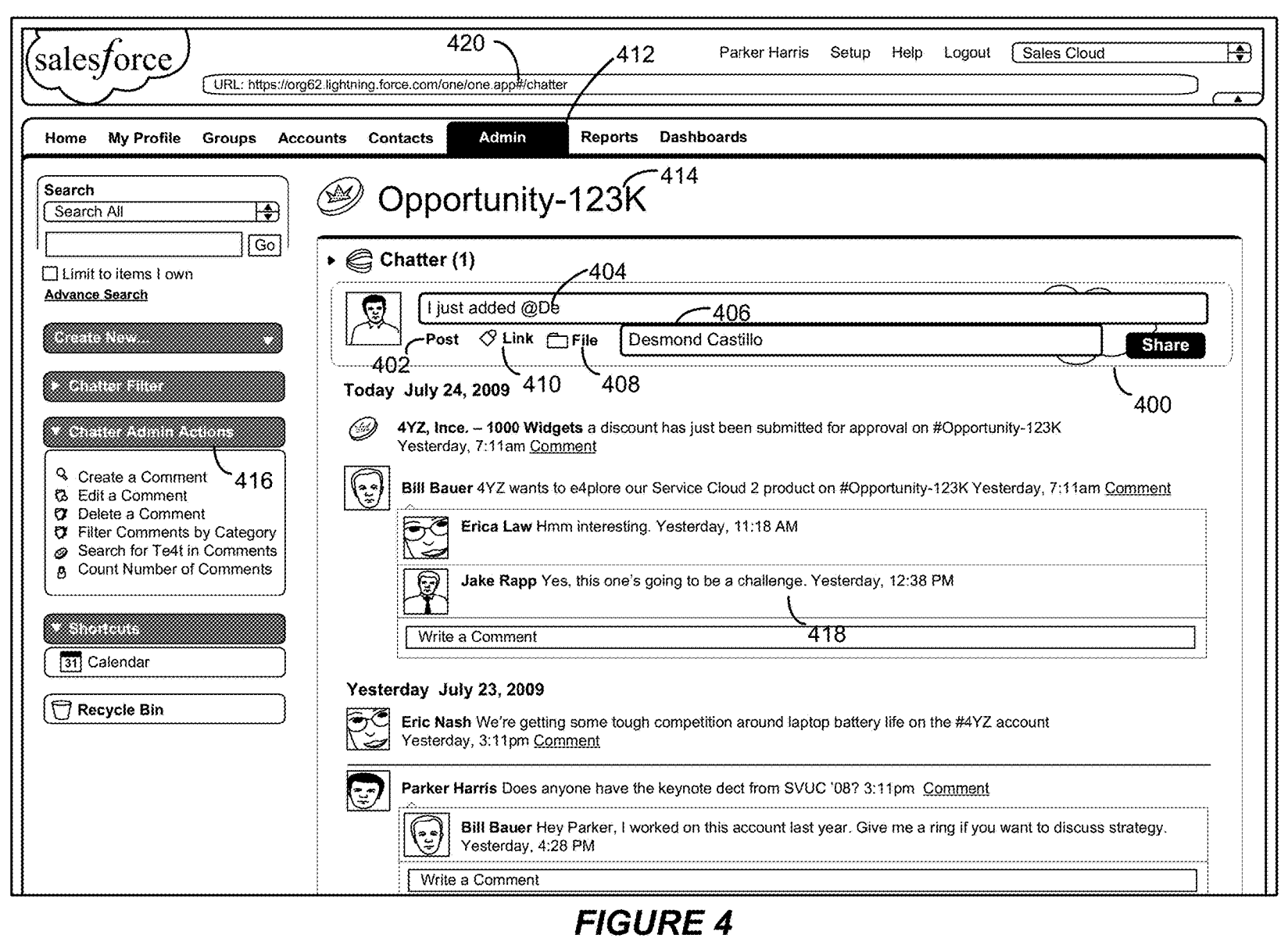
Figure 5:
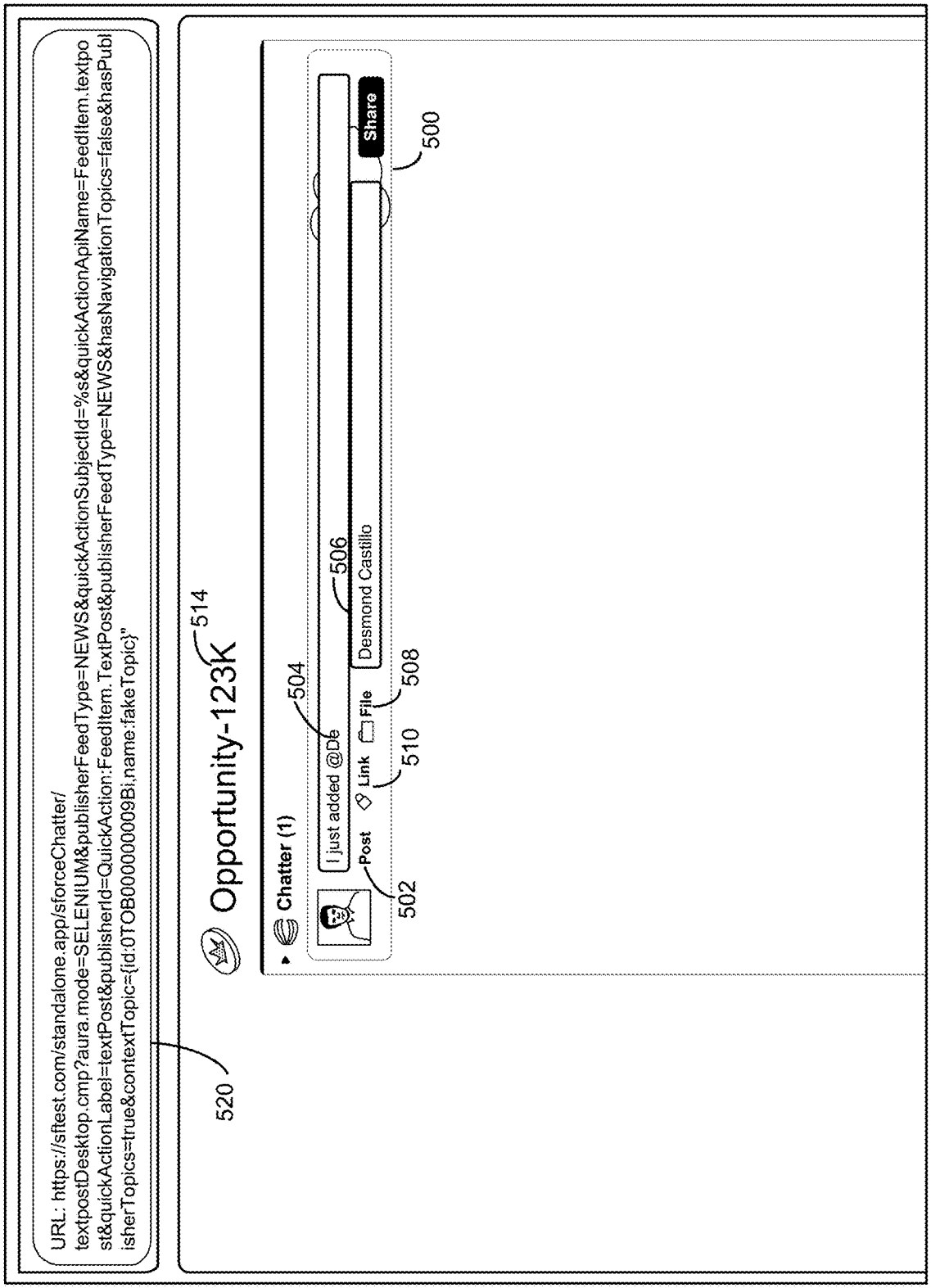
FIG. 5 shows another example of a presentation displayed in the form of a GUI for some implementations of automated end-to-end testing of user interface components.

In various implementations, the UI component being tested is accessible through a URL corresponding to the UI component. For example, FIG. 4 depicts a post publisher 400 that is navigated to by logging in to a salesforce.com, inc. domain at URL 420 and selecting the Admin tab. In contrast, as illustrated in FIG. 5, the standalone application provides an environment where the URL 520 for the publisher 500 can be directly loaded to avoid navigating through the salesforce.com, inc. domain and clicking the Admin tab.

In certain implementations, the UI component to test is modeled with a target page object that is initialized in 114. Similar to test methods 100a-b, in 116, the test script uses the target page object initialized in 114 to perform a test on the UI component. Furthermore, the results of the test can be validated similar to as described above. It should be appreciated that in test method 100c, a second UI component can be tested without reloading the application container, such as, for example, by reusing a customized context for context 110. In some implementations, the second UI component can include the first UI component. It should further be appreciated that the above examples are merely illustrative, and the below description provides additional details on features that can be included in certain implementations.

A web application, referred to herein as an application, is a container for the objects, tabs, resources, and other functionality that is being provided to a user of the application. In some implementations, a user interface component can encapsulate a modular and potentially reusable section of a user interface (UI) of the application. During development, a user interface component, such as a user interface for publishing posts to a feed, undergoes testing to determine compliance with quality control measures. The characteristics of the testing methodology for validating a UI component can be affected by the application that the UI component is contained within, also referred to herein as an "application container" or "container."

A different container can be used to provide a unique and engaging experience for each target user group for the functionality associated with a particular component. For example, a cloud computing service provider may provide an organization with tools for engaging with entities within the organization, along with tools to engage with constituencies external to the organization, including but not limited to consumers, customers, prospects, resellers, partners, integrators, dealers, and other constituencies. Each constituency has a unique set of needs. For example, an illustrative customer portal can be used as a vertically-oriented process portal established for a specific purpose (e.g., customer self-service), and involve engagement tools such as maintenance of data and process (logging cases, registering leads, etc.) as well as searching for relevant information to resolve issues. The portal can be further augmented with collaboration tools from salesforce.com, inc. like Chatter, Ideas, and Q&A.

A different portal design can be generated to provide a unique experience for each target constituency. Each portal may be created in a different application framework, such as the salesforce.com, inc. Classic tab paradigm, a custom interface built programmatically using Visualforce, a custom interface built declaratively using Site.com, a mobile friendly interface using Salesforce1 (or the Lightning framework built on the Salesforce1 platform), or using the self service Communities framework. Each of these options represents a container. A container corresponds to a top-level architectural choice for how to deliver pages in a cloud computing service.

Choice of a container determines not only how pages are built, how native page functionality is treated, and the extent of the customizability and strategy for a mobile deployment.

The choice of a container has implications in categories such as page construction, branding approaches, navigation paradigm, mobile strategies, and choices for declarative build tools and programmatic build tools. For example, the salesforce.com Classic tab container allows reuse of standard layouts, but at the expense of flexibility, such as an imposed horizontal navigation structure, and lack of support for responsive design principles. In contrast, Site.com offers layout flexibility and templating, but the declarative web content management system can lack the power and flexibility of code-level control of a page. The Visualforce container, on the other hand, provides flexibility and control, but this flexibility can come at the expense of organizational agility, as most UI changes may have to go through a team of developers, as opposed to administrators or business users.

It should be appreciated that the container choices outlined above are not an exhaustive list, and are not mutually exclusive. For example, when using the salesforce.com Classic tab container, it is still possible to use Visualforce and Site.com to drive portions of the application.

Another example of the effect of the container is described as follows. The salesforce Lightning Container allows uploading of a component developed with a third-party framework as a static resource, and hosting the content using Lightning:container. For example, Lightning:container allows components created in third-party frameworks like AngularJS or React to run within Lightning pages. The Lightning:container hosts content in an iframe, and can implement communication to and from the framed application. However, use of Lightning:container has limitations. For example, a user may observe performance and scrolling issues, and lack of integration with browser navigation history. As another example, if a user of a web browser navigates away from the page and a Lightning:container is being used, the component does not automatically remember its state. As a further example, the content within the iframe does not use the same offline and caching schemes as the rest of the components in Lightning.

Yet another example of the effect of the container is the Lightning Out container. Using Lightning Out, a developer can deploy a Lightning component anywhere Lightning Out is supported, which includes non-salesforce.com, inc. environments. However, because an component in a Lightning Out container run outside of any salesforce.com container, such components may result in different behavior relative to standard Lightning components that are running within the salesforce.com Lightning container.

For instance, certain components depend on setting cookies in a user's browser. Since Lightning Out runs outside of a salesforce.com Lightning container, those cookies are considered as "third-party" cookies. For proper operation of the component in Lightning Out, users need to allow third-party cookies in their browser settings, which involve the issue of authentication. However, since there is not necessarily a salesforce.com Lightning container that already handles authentication, the component in Lightning Out may have to address authentication issues if applicable.

Another issue when using Lightning Out involves event handling. Certain cloud computing services are based on a framework that uses event-driven programming. This can involve implementing event handlers that respond to interface events as they occur. The events may or may not have been triggered by user interaction (e.g., mouse click). For example, actions supported by a component are accomplished by firing various Lightning events. In the case of many core Lightning events, the "listener" is the Lightning container or Salesforce1 container, one.app. By way of illustration, if, for example, one.app is not present to handle the events, they have no effect, therefore firing those events silently fails. Therefore, events associated with the Lightning Out container should be handled properly for proper functioning of a UI component in the Lightning Out container.

Put alternatively, certain components may not behave correctly when used outside of a salesforce.com container (i.e., running in a standalone environment), such as within Lightning Out. This is because the components implicitly depend on resources available in, as a non-limiting example, the one.app container.

An example of an implementation to avoid this dependency issue for components is by making all the dependencies explicit. For example, certain limitations can use ltng:require to reference all required JavaScript and CSS resources that aren't embedded in the component itself.

In certain other implementations, a Lightning dependency application is created to describe the component dependencies of a component to be deployed using Lightning Out. When an application is initialized using Lightning Out, Lightning Out loads the definitions for the components in the application. To do this efficiently, Lightning Out can require specification of the component dependencies in advance, so that the definitions can be loaded once, at startup time.

As a non-limiting example, the Lightning dependency application can be an <aura:application> with certain attributes, and the dependent components described using the <aura:dependency> tag. The <aura:dependency> tag enables declaration of dependencies, which improves their discoverability by the framework. The Lightning Out framework automatically tracks dependencies between definitions, such as components, defined in markup. This enables the framework to send the definitions to the browser. However, as a non-limiting example, if a component's JavaScript code dynamically instantiates another component or fires an event that isn't directly referenced in the component's markup, <aura:dependency> can be used in the component's markup to explicitly tell the framework about the dependency. Adding the <aura:dependency> tag ensures that a definition, such as a component, and its dependencies are sent to the client, when needed. It should be appreciated that a Lightning dependency application is not deployed as an application for customers to use directly. Instead, a Lightning dependency application is used to specify the dependencies for component contained within the Lightning Out framework.

By way of example, salesforce.com's Chatter includes a collection of UI components that can be used in a variety of containers. Chatter provides a rich suite of features, including user profiles, feed updates, comments, groups, and feeds. These features add a collaborative and social dimension to applications. Numerous UI functionalities have already been developed as components available for reuse. Examples of Chatter user interface components include the @ mention functionality in publisher 400 of FIG. 4. For example, in a Post 402 to a group 414 with a message body input 404 of "I just added @des," when typing after the @ sign, a user is prompted in list 406 to select from people being followed, as well as other people in the same organization. As non-limiting examples, additional UI components in publisher 400 include file attachment action 408 and URL link action 410.

Applications and the components within an application are tested for quality assurance purposes. For efficiency, tests are automated using software that simulates the operation of the web browser by a user of an application running in the web browser. An application can undergo automated testing in a variety of test environments. By way of illustration, Selenium WebDriver is an automated testing environment. For example, a tester or developer, through his/her test script, can command WebDriver to perform certain actions on the application under test (AUT) on a certain browser. The way the user can command WebDriver to perform web browser actions is by using the client libraries or language bindings provided by WebDriver. These libraries are provided in different languages, such as Java, Ruby, Python, Perl, PHP, and .NET. By using the language-binding client libraries, developers can invoke the browser-specific implementations of WebDriver, such as Firefox Driver, Internet Explorer Driver, Opera Driver, and so on, to interact with the AUT on the respective browser. These browser-specific implementations of WebDriver can work with the browser natively and execute commands to simulate the application user. After execution, WebDriver can send out the test result back to the test script for analysis.

Page Objects are a software design pattern that can be implemented as a best practice for writing Selenium WebDriver tests. The functionality of classes, or Page Objects, in the design pattern represent a logical relationship between the pages of the application. By way of illustration, the Page Object pattern can represent the screens of an application as a series of objects that encapsulate the features represented by a page, thereby allowing modeling of UI components in tests. The public methods of a Page Object represent the services that the page offers.

The page factory class provides a way of initializing and mapping the Page Object fields. By default, it will map Page Object properties to fields with matching ids or names.

Some of the advantages of the Page Object pattern include reducing the duplication of code, making tests more readable and robust, and improving the maintainability of tests, particularly when there are frequent changes in the AUT.

By way of illustration, referring to FIG. 4, the "Admin" page 412 for a Chatter group 414 can correspond to an Admin Page Object that provides six services under Chatter Admin Actions 416, such as:

Create a Comment
Edit a Comment
Delete a Comment
Filter comments by Category

Search for text in comments

Count the number of comments available

Once a Selenium test script obtains an instance of the Admin Page Object via the login service of, such as, for example, an AdminLoginPage Page Object, it can use any of the six services of the Admin Page Object to perform tests. If any of the implementation details change, such as the navigation to a particular comment 418 or the identifier (ID) of a Webpage Element or default locator on the Admin page, the Selenium test script itself does not need to be modified. Instead, modifying the Admin Page Object can accommodate the corresponding changes.

As a non-limiting example, the following is a sequence of operations executed in a Selenium test script to test adding a new comment to the Chatter feed:

1. First, the test script creates a FirefoxDriver instance, because the test scenario involves adding a new comment to the feed on the Firefox browser.

2. Then, the test script creates an instance of the AdminLoginPage Page Object that uses the same FirefoxDriver instance created in the previous operation.

3. Once the test script gets the instance of the AdminLoginPage Page Object, it uses the login service to log in to the Chatter admin console. The login service, in return, gives out an instance of the Admin Page Object instance to the test script.

4. The test script uses the instance of the Admin Page Object obtained in the previous operation to use one of the many services provided by the Admin page. For example, the test script can use a createANewComment service provided by the Admin Page Object.

5. The test script can proceed to create a new comment on the feed, such as by stimulating the behavior of a user typing into a message input field and clicking "Share."

6. The test script can validate whether the comment was added to the feed by determining if the total number of comments has increased by 1.

Figure 2:
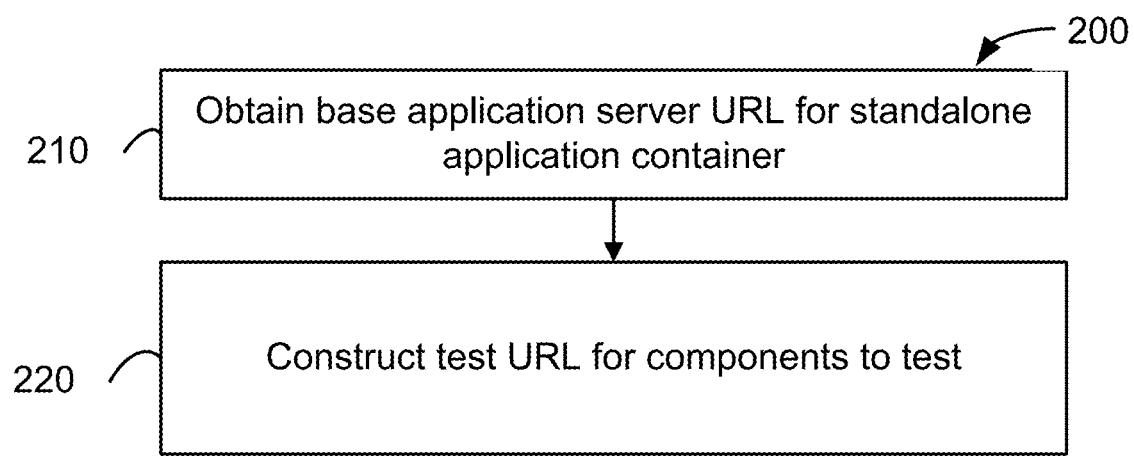
FIG. 2 shows a flowchart of an example of setting up inputs for some implementations of automated end-to-end testing of user interface components.

FIG. 2 shows a flowchart 200 of an example of setting up inputs for some implementations of automated end-to-end testing of user interface components.

At 210, the setup process includes obtaining a base application server URL. This base application server URL can correspond to the server hosting a standalone application. The standalone application can be configured during execution of an automated test to receive a page object context as an input. In doing so, the standalone application fits the page object hierarchy for the target test suite, and existing page objects can be reused without the application container such as one.app or selfservice.app. In certain implementations, the customized page object context includes the base application server URL obtained during test system setup.

In various implementations, the standalone application corresponds to an interface that extends an existing application or component implementation. In some but not all implementation, the standalone application implements locator names corresponding to variants of spinners. In some implementations, the base application server URL can be obtained by getting a URL map and obtaining the application server path.

At 220, the setup process includes constructing a test URL for the UI component including the user interface features to test. In some implementations, constructing a test URL corresponds to getting a current URL for a current WebDriver. In certain implementations, constructing a test URL corresponds to populating a test URL based on combining a set of URL parameters that define a configuration of a UI component. The construction of the test URL provides a mechanism to, for example, inject the parameters of the UI component to test without relying on navigation through an application container. For example, a UI component test URL which injects parameters specifying, for example, the feed type being "NEWS," the absence of Navigation Topics, the available Quick Action items, and so forth is provided as follows:

"% sforceChatter/textPostDesktop.cmp?aura.mode=SELENIUM&publisherFeedType=NEWS&quickActionSubjectId=%s&quickActionApiName=FeedItem.TextPost&quickActionLabel=TextPost&publisherId=QuickAction:FeedItem.TextPost&publisherFeedType=NEWS&hasNavigationTopics=false&hasPublisherTopics=true&contextTopic={id:0T0B000000009Bi.name:fakeTopic}"

The exact configuration of the parameters can be with reference to other UI component tests, such as Aura UI component tests. It should be appreciated that for construction of the test URL, the application server base URL is not filled (as represented by the "%sforceChatter" portion) until the base URL information is populated by initializing the current WebDriver. In some implementations, a parameter such as "appLayOut" can be used to specify a form factor associated with the component (e.g., phone, tablet, desktop). In certain implementations, such form factor information can be indicated by use of specific UI components that are different between mobile and desktop environment. For example, in the above example URL, the field "textPostDesktop.cmp" identifies a desktop environment. In some implementations, a mode corresponding to the automated testing environment can be indicated, such as with the "aura.mode=SELENIUM" portion of the above example URL.

Figure 3:
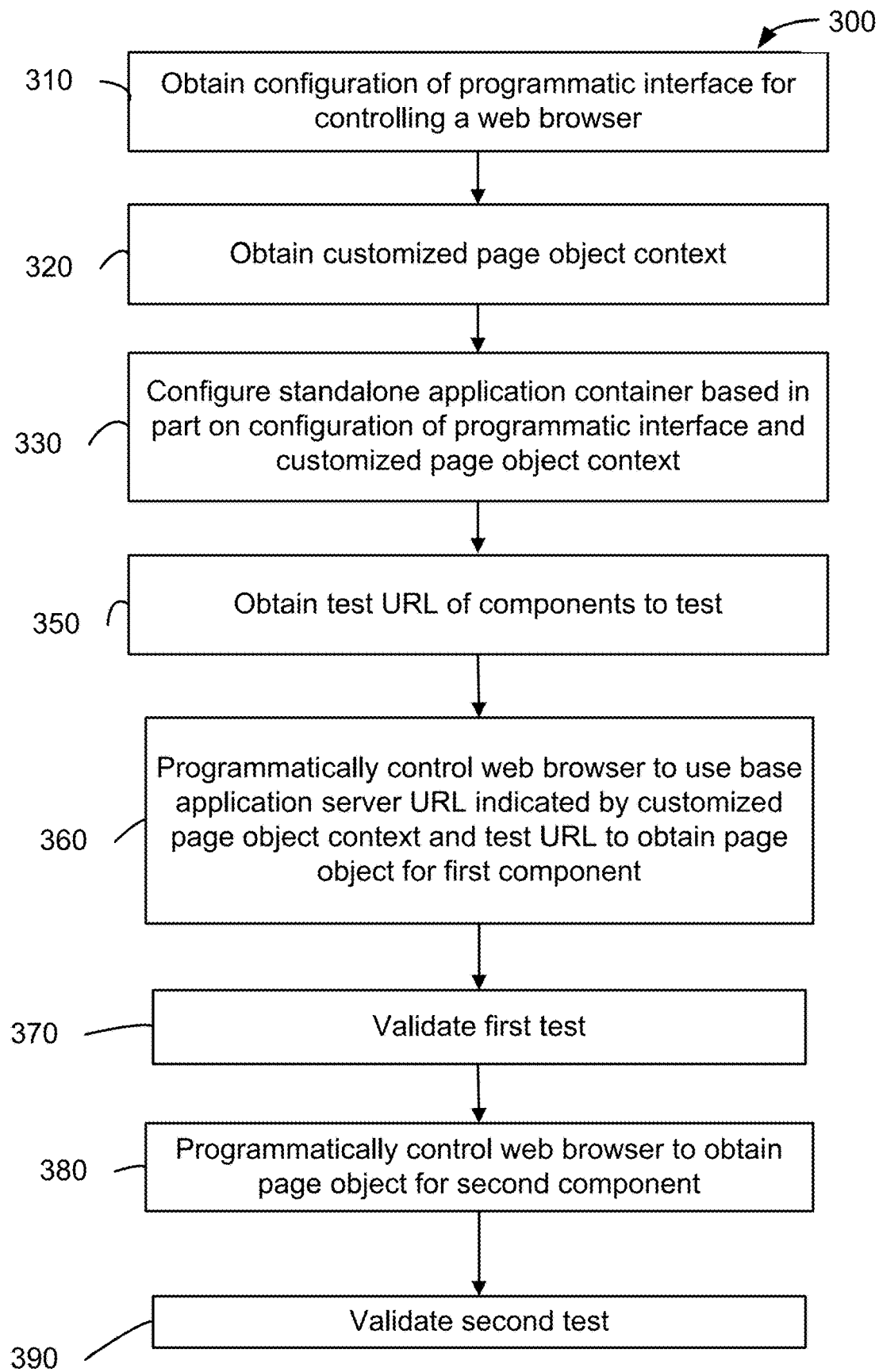
FIG. 3 shows a flowchart of an example of some operations in some implementations of automated end-to-end testing of user interface components.

FIG. 3 shows a flowchart of an example of some operations in some implementations of automated end-to-end testing of user interface components.

At 310, the testing process includes obtaining a configuration of a programmatic interface for controlling a web browser. By way of illustration, the programmatic interface can correspond to a Selenium WebDriver instance.

At 320, the testing process includes obtaining a customized page object context. This operation can include generating a page object context, or annotating a page object context, with a page object hierarchy supporting the target test suite. In certain implementations, the page object context can be derived from WebDriver operation in the original application container containing the UI components to test. In certain implementations, an indication to annotate the test with proper application context values can be provided if the page context is not initialized. In some implementations, the method for generating a page object context overrides an existing method for configuration of a page object context.

At 330, the testing process includes configuring the standalone application container based in part on the configuration of the programmatic interface and customized page object context.

At 350, the testing process includes obtaining a test URL of components to test. In certain implementations, generation of the test URL is as previously discussed for 230 of FIG. 2.

At 360, the testing process includes programmatically controlling the web browser to use the base application server URL indicated by the customized page object context and the first test URL to load the first UI component to test, obtaining the first page object representing the first UI component to test, and programmatically controlling the web browser to perform the first test on the first UI component. For example, the web browser can issue one or more content requests corresponding to the first UI component.

It should be appreciated that rather than using a programmatic interface, such as Selenium WebDriver to navigate to a particular UI component, the test methodology utilizes the base URL and component URL to directly access the UI component. For example, FIG. 4 depicts a post publisher 400 that is navigated to by logging in to a salesforce.com domain at URL 420 and selecting the Admin tab. In contrast, as illustrated in FIG. 5, the standalone application provides an environment where the URL 520 for the publisher 500 can be used to avoid navigating through the salesforce.com domain and clicking the Admin tab. For example, the UI component URL can correspond to the input area of publisher 500, which can contain the interaction that triggers the @ mention feature, rather than the UI component URL corresponding to loading of the @mention feature itself.

It should be appreciated that loading the UI component rather than navigating to the UI component can reduce the dependencies that the UI component being tested has on the original application container, thereby reducing testing complexity. In various implementations, the scope of the first page object is limited to the UI component being tested. For example, if the page object code has container locators, the code can be updated to not have container locators. In particular implementations, performing the test on the UI component involves disabling associated accessibility testing.

Returning to FIG. 3, at 370, the testing process includes validating the results of the first test.

At 380, the testing process includes programmatically controlling the web browser to obtain a second page object representing a second UI component to test, and programmatically controlling the web browser to perform the second test on the second UI component.

At 390, the testing process includes validating the results of the second test.

It should be appreciated that the testing of the second UI component can occur without reloading of the standalone application as performed in 330. In certain implementations, the second UI component contains the first UI component. In various implementations, the second test on the second UI component includes a determination of the functionality of the first UI component. For example, the first UI component may correspond to the page object having an @mention action to test, such as for the message body input field, and the first test may correspond to a selection of a name provided as an option under the @mention feature. Continuing the example, the second UI component may correspond to a second page object representing a post publisher containing the message body input field (i.e., the second page object includes the first page object), and the second test may correspond to posting the contents of the message body input field after a particular name provided by the @mention feature was selected. Thus, for a particular page object context, the disclosed techniques provide flexibility in the components to test. The above example involving testing the @mention feature is merely illustrative. Examples of other tests that can also be performed include, but are not limited to, scenarios involving topic assignment, topic auto-suggestion, rich text publisher features, and so forth.

It should be further appreciated that in certain implementations, the page objects used by the standalone application can also be used to perform traditional WebDriver tests, namely navigation through an application for an end-to-end test. In other words, the same sets of page objects can be used for both UI component level WebDriver tests or end-to-end WebDriver tests. Certain tests may not be available for UI component level WebDriver testing. Nonlimiting examples involving testing of UI components that may not have a corresponding URL, and therefore would not support UI component level Web Driver tests, includes UI components involving integration, such as information relating to users provided by a separate domain, or a file attachment for a particular file from a separate domain.

Systems, apparatus, and methods are described below for implementing database systems and enterprise level social and business information networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

By way of example, a user can update a record in the form of a CRM object, e.g., an opportunity such as a possible sale of 1000 computers. Once the record update has been made, a feed tracked update about the record update can then automatically be provided, e.g., in a feed, to anyone subscribing to the opportunity or to the user. Thus, the user does not need to contact a manager regarding the change in the opportunity, since the feed tracked update about the update is sent via a feed to the manager's feed page or other page.

Figure 6A:
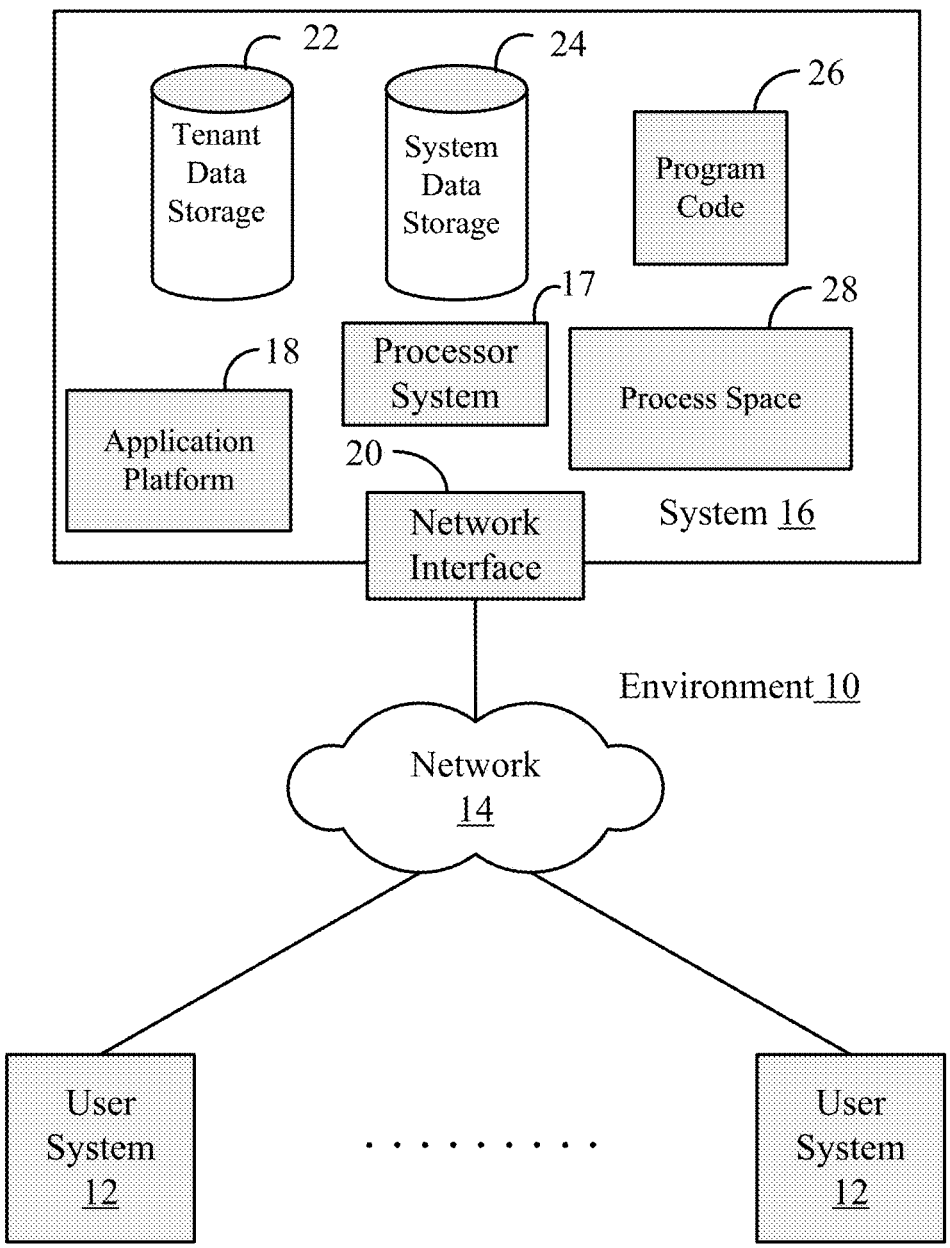
FIG. 6A shows a block diagram of an example of an environment 10 in which an on-demand database service can be used in accordance with some implementations.

FIG. 6A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 6A (and in more detail in FIG. 6B) user systems 12 might interact via a network 14 with an on-demand database service, which is implemented in the example of FIG. 6A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 6A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 7A:
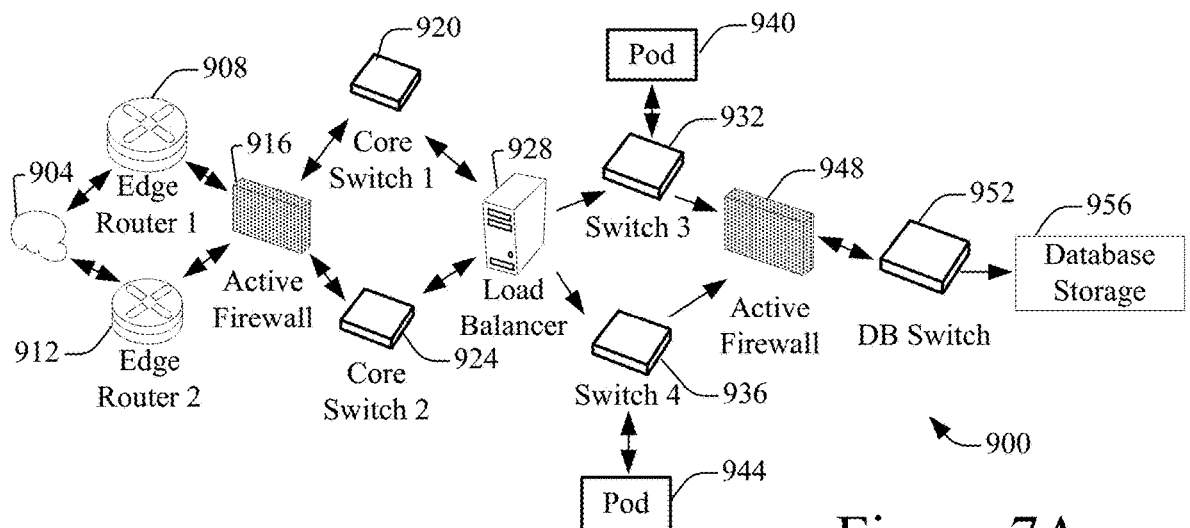
FIG. 7A shows a system diagram of an example of architectural components of an on-demand database service environment 900, in accordance with some implementations.
Figure 7B:
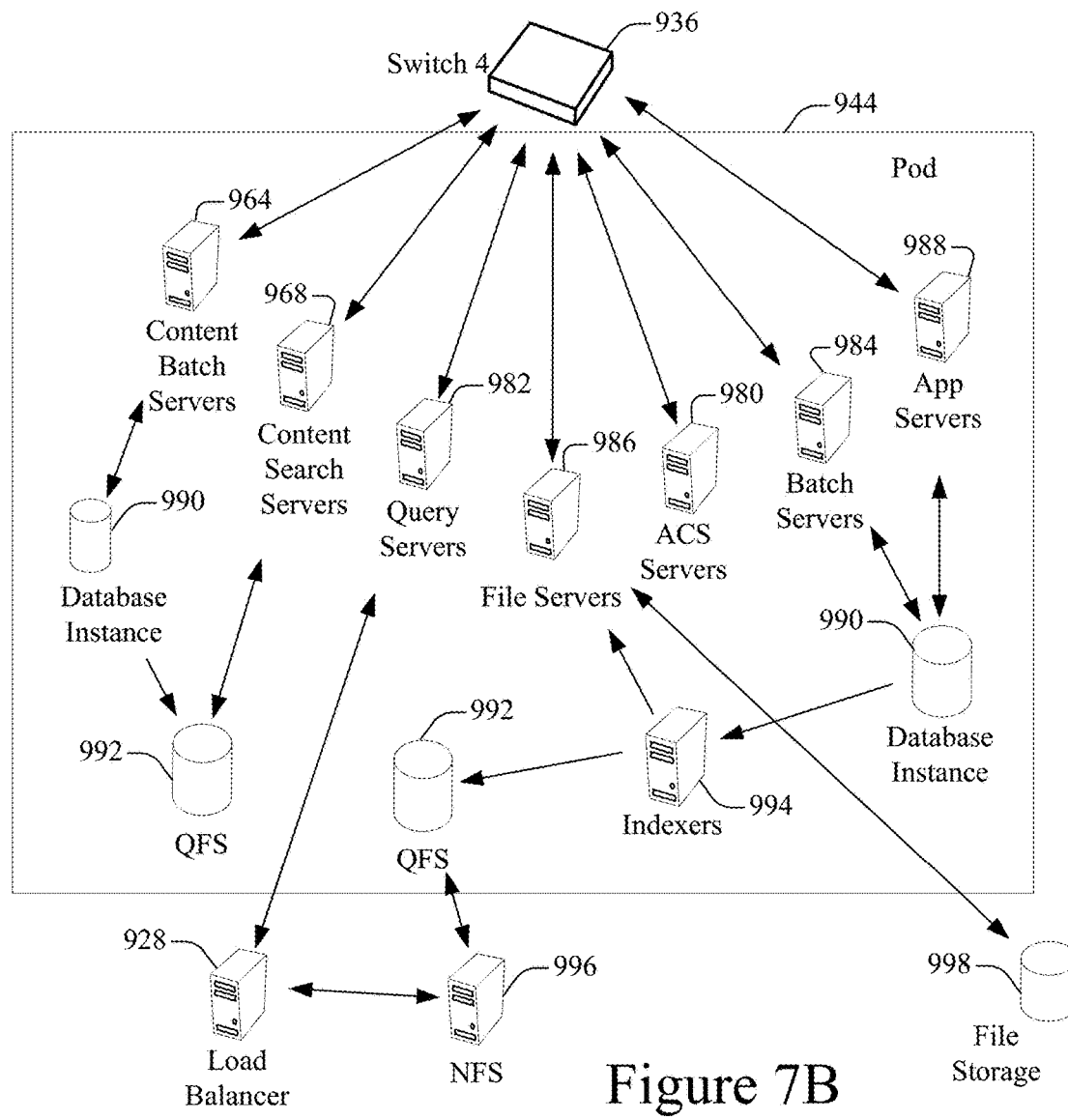
FIG. 7B shows a system diagram further illustrating an example of architectural components of an on-demand database service environment, in accordance with some implementations.

One arrangement for elements of system 16 is shown in FIGS. 7A and 7B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 6A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

Figure 6B:
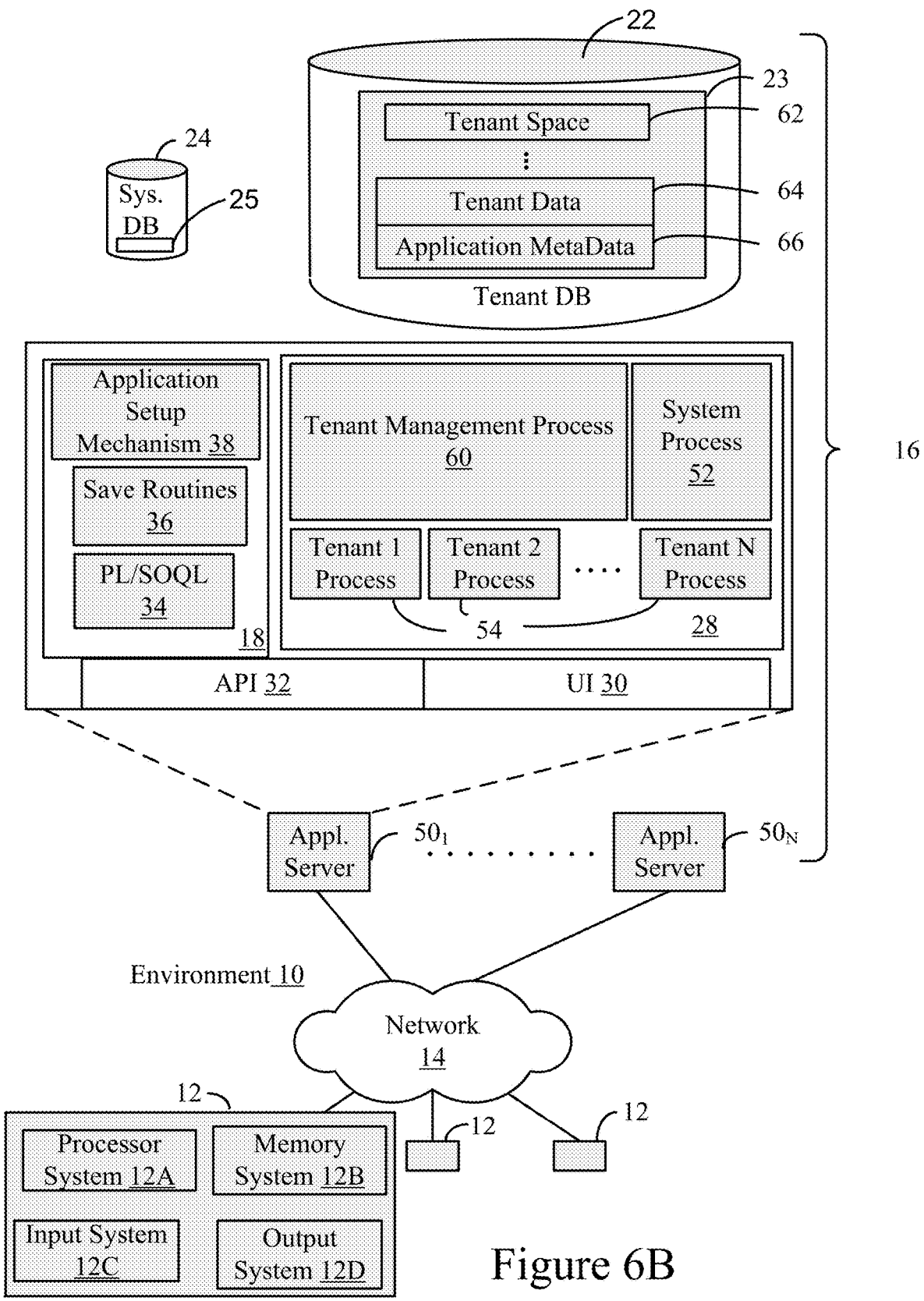
FIG. 6B shows a block diagram of an example of some implementations of elements of FIG. 6A and various possible interconnections between these elements.

FIG. 6B shows a block diagram of an example of some implementations of elements of FIG. 6A and various possible interconnections between these elements. That is, FIG. 6B also illustrates environment 10. However, in FIG. 6B elements of system 16 and various interconnections in some implementations are further illustrated. FIG. 6B shows that user system 12 may include processor system 12A, memory system 12B, input system 12C, and output system 12D. FIG. 6B shows network 14 and system 16. FIG. 6B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 6A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 6B, system 16 may include a network interface 20 (of FIG. 6A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server 50$_1$ might be coupled via the network 14 (e.g., the Internet), another application server 50$_{N-1}$ might be coupled via a direct network link, and another application server 50$_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 7A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

As shown in FIGS. 7A and 7B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 7A and 7B, some implementations of an on-demand database service environment may include anywhere from one to many devices of each type. Also, the on-demand database service environment need not include each device shown in FIGS. 7A and 7B, or may include additional devices not shown in FIGS. 7A and 7B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 7B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 7A and 7B.

FIG. 7B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and application servers 988. Also, the pod 944 includes database instances 990, quick file systems (QFS) 992, and indexers 994. In one or more implementations, some or all communication between the servers in the pod 944 may be transmitted via the switch 936.

In some implementations, the application servers 988 may include a hardware and/or software framework dedicated to the execution of procedures (e.g., programs, routines, scripts) for supporting the construction of applications provided by the on-demand database service environment 900 via the pod 944. In some implementations, the hardware and/or software framework of an application server 988 is configured to cause performance of services described herein, including performance of one or more of the operations of methods described herein with reference to FIGS. 1-5. In alternative implementations, two or more application servers 988 may be included to cause such methods to be performed, or one or more other servers described herein can be configured to cause part or all of the disclosed methods to be performed.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the application servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the application servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory ("ROM") devices and random access memory ("RAM") devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system for testing a user interface component, the system comprising:
   a computing system comprising one or more hardware processors and at least one memory storing thereon computer-readable instructions, the computing system configured to cause:
   executing a test script, the test script configured to simulate user interactions with one or more user interface components of a web application, the test script being configured to cause:
   identifying a network address corresponding to a first web page including a first user interface component of the web application or corresponding to a portion of the first web page, the portion of the first web page including the first user interface component;
   loading the first user interface component using the network address, the network address including a Uniform Resource Locator (URL) corresponding to the first user interface component, wherein loading the first user interface component is performed without navigating to the first web page via the web application;
   requesting by a web browser, via a function of a first page object corresponding to the first web page or corresponding to the first user interface component, a first manipulation of the first user interface component, the first manipulation simulating an end-user interaction with the first user interface component, the function being one of a plurality of functions of the first page object, each of the functions being associated with a corresponding one of a plurality of user interface services offered by the first web page; and
   obtaining by the web browser, after requesting the first manipulation of the first user interface component, first information describing a state of the first user interface component following the first manipulation of the first user interface component.

2. The system of claim 1, wherein the computing system is further configured to cause:
   configuring the test script using a context, the context comprising properties of the first page object.

3. The system of claim 1, wherein the computing system is further configured to cause:
   configuring the test script using a base application server Uniform Resource Locator (URL), the base application server URL corresponding to a computing device hosting the test script.

4. The system of claim 3, wherein the computing system is further configured to cause:
   configuring the test script to combine a test URL with the base application server URL, the test URL corresponding to a state of the first user interface component.

5. The system of claim 4, wherein the computing system is further configured to cause:
   generating the test URL based at least in part on combining a first set of URL parameters, the first set of URL parameters defining a configuration of the first user interface component.

6. The system of claim 1, the first web page being a web page of the web application.

7. The system of claim 1, wherein the computing system is further configured to cause:
   configuring the test script using the network address corresponding to the first web page or the portion of the first web page including the first user interface component.

8. The system of claim 1, wherein the computing system is further configured to cause:
   configuring the test script using a web page element identifier corresponding to the portion of the first web page including the first user interface component.

9. The system of claim 1, wherein the computing system is further configured to cause:
   generating the network address using a base application server Uniform Resource Locator (URL) corresponding to a computing device hosting the test script and a component URL corresponding to the first user interface component.

10. A method for testing a user interface component, the method comprising:
    executing a test script, the test script configured to simulate user interactions with one or more user interface components of a web application, the test script being configured to cause:
    identifying a network address corresponding to a first web page including a first user interface component of the web application or corresponding to a portion of the first web page, the portion of the first web page including the first user interface component;
    loading the first user interface component using the network address, the network address including a Uniform Resource Locator (URL) corresponding to the first user interface component, wherein loading the first user interface component is performed without navigating to the first web page via the web application;
    requesting by a web browser, via a function of a first page object corresponding to the first web page or corresponding to the first user interface component, a first manipulation of the first user interface component, the first manipulation simulating an end-user interaction with the first user interface component, the function being one of a plurality of functions of the first page object, each of the functions being associated with a corresponding one of a plurality of user interface services offered by the first web page; and
    obtaining by the web browser, after requesting the first manipulation of the first user interface component, first information describing a state of the first user interface component following the first manipulation of the first user interface component.

11. The method of claim 10, further comprising:
    configuring the test script using a context, the context comprising properties of the first page object, the first page object representing the first user interface component.

12. The method of claim 10, further comprising:
configuring the test script using a base application server Uniform Resource Locator (URL), the base application server URL corresponding to a computing device hosting the test script.

13. The method of claim 12, further comprising:
configuring the test script to combine a test URL with the base application server URL, the test URL corresponding to a state of the first user interface component.

14. The method of claim 13, further comprising:
generating the test URL based at least in part on combining a first set of URL parameters, the first set of URL parameters defining a configuration of the first user interface component.

15. The method of claim 10, the first web page being a web page of the web application, the first page including the first user interface component.

16. A computer program product comprising one or more non-transitory computer readable media having computer program instructions stored therein, the computer program instructions being configured such that, when executed by one or more processors, the computer program instructions cause:
executing a test script, the test script configured to simulate user interactions with one or more user interface components of a web application, the test script being configured to cause:
identifying a network address corresponding to a first web page including a first user interface component of the web application or corresponding to a portion of the first web page, the portion of the first web page including the first user interface component;
loading the first user interface component using the network address, the network address including a Uniform Resource Locator (URL) corresponding to the first user interface component, wherein loading the first user interface component is performed without navigating to the first web page via the web application;
requesting by a web browser, via a function of a first page object corresponding to the first web page or corresponding to the first user interface component, a first manipulation of the first user interface component, the first manipulation simulating an end-user interaction with the first user interface component, the function being one of a plurality of functions of the first page object, each of the functions being associated with a corresponding one of a plurality of user interface services offered by the first web page; and
obtaining by the web browser, after requesting the first manipulation of the first user interface component, first information describing a state of the first user interface component following the first manipulation of the first user interface component.

17. The computer program product of claim 16, the instructions further configured to cause:
configuring the test script using a context, the context comprising properties of the first page object.

18. The computer program product of claim 16, the instructions further configured to cause:
configuring the test script using a base application server Uniform Resource Locator (URL), the base application server URL corresponding to a computing device hosting the test script.

19. The computer program product of claim 18, the instructions further configured to cause:
configuring the test script to combine a test URL with the base application server URL, the test URL corresponding to a state of the first user interface component.

20. The computer program product of claim 19, the instructions further configured to cause:
generating the test URL based at least in part on combining a first set of URL parameters, the first set of URL parameters defining a configuration of the first user interface component.

\* \* \* \* \*